H. ILL.
CASTER STRUCTURE FOR TUBULAR LEGS.
APPLICATION FILED JULY 3, 1912.
1,125,104.
Patented Jan. 19, 1915.
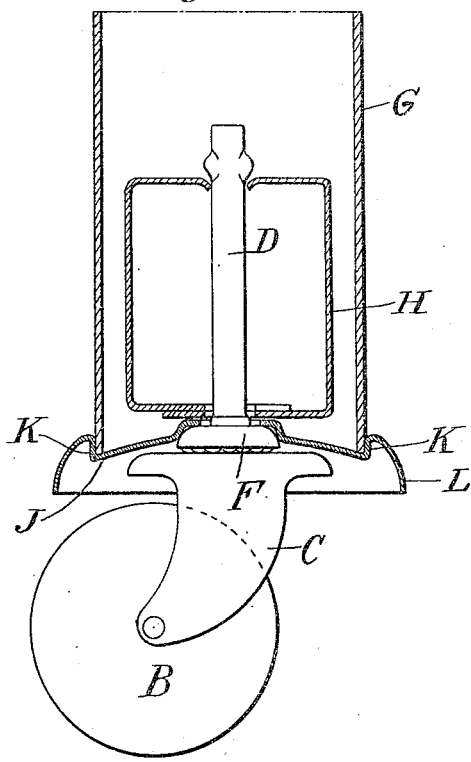
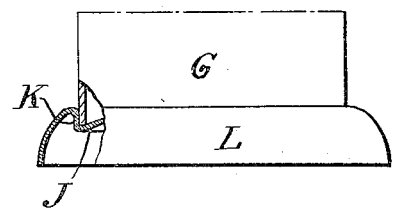
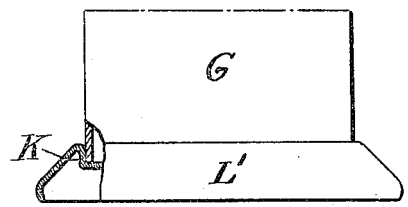
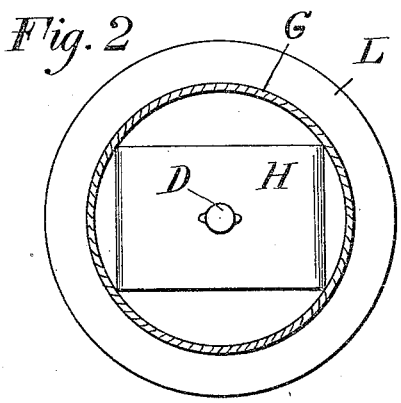
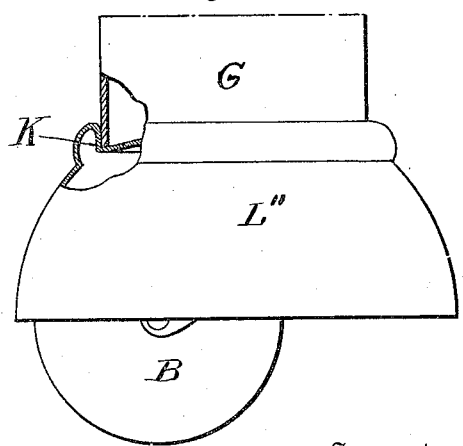

UNITED STATES PATENT OFFICE.

HENRY ILL, OF NEWARK, NEW JERSEY, ASSIGNOR TO UNIVERSAL CASTER & FOUNDRY COMPANY, OF NEW YORK, N. Y., A CORPORATION OF NEW JERSEY.

CASTER STRUCTURE FOR TUBULAR LEGS.

1,125,104.  Specification of Letters Patent.  Patented Jan. 19, 1915.

Application filed July 3, 1912. Serial No. 707,554.

*To all whom it may concern:*

Be it known that I, HENRY ILL, a resident of Newark, New Jersey, have invented certain new and useful Improvements in Caster Structures for Tubular Legs, of which the following is a specification, accompanied by drawings.

The invention relates particularly to that class of caster structures designed for the large and relatively thin tubular legs of bedsteads and other furniture.

The invention comprises an improved caster structure for tubular legs combining ornament and utility in such a way that one member of the structure is adapted to mechanically center the leg supporting plate of the caster upon the exterior surface of the leg, but is itself centered and substantially hidden by an outer continuation of ornamental design which extends outward and downward from the leg.

The invention will be readily understood from the following description and the drawings and the features claimed pointed out in the accompanying claims.

In the drawings, Figure 1 is an elevation, partly in section, showing one preferred embodiment of the invention; Fig. 2 is a plan view of the same showing the leg in section; Fig. 3 is a detail view of certain features; Fig. 4 shows a slightly different embodiment of certain features of the invention; and Fig. 5 shows yet another embodiment of certain features.

At B is shown the caster wheel, C the jaws or horn, and D the pintle of the caster, preferably provided with ball bearings, as at F, for facilitating the turning of these members relatively to the tubular leg G.

At H is shown the spring frame, in which the upper end of the caster pintle is centered, as will be well understood, and which constitutes means for acting frictionally upon the interior of the tubular leg to retain the caster structure so that it will not fall out when the leg is raised. The form of pintle holder, frame, or frictional device may, of course, be widely varied.

At J is shown the leg supporting plate, through which the pintle extends, and in which it is centered, preferably by directly fitting around the pintle D, as illustrated. This leg supporting plate J is of strong sheet metal and is provided with an upturned flange K, which surrounds and preferably closely fits the exterior surface of the leg, and is adapted to thereby center the leg supporting plate J in respect to the exterior surface of the leg, the flange K constituting a collar around the leg. From the upper portion of this collar the sheet metal of the plate is bent outward, forming an outwardly turned leg mount flange L, which, by a gentle curve or other suitable design, is extended downward, as shown, so that it forms an ornamental leg mount surrounding and hiding the mechanical feature of the surrounding collar K, and it may also, to a large extent, cover and conceal the caster jaws. It will be evident that the leg supporting plate with the upturned flange K and leg mount flange L can be readily formed by spinning the metal, or, in the cheaper grades, by stamping.

It will be evident that the design and proportions of the leg mount flange may be greatly varied, while still being so formed that it extends down and conceals, to a greater or less degree, the mechanical features of the caster. Thus, in Fig. 4, the leg mount flange L', after extending outward and downward, is turned inward at its lower edge. In Fig. 5, the leg mount flange L'', after rounding over and extending almost directly downward, extends outward and downward in a gentle curve, forming a very large ornamental covering over the caster jaws.

As the leg mount extends downward and outward to a level considerably below the foot of the leg, it furnishes a protection for the ball bearings and other parts of the caster against dust and against the likelihood of portions of brooms and other bodies getting into the bearings of the casters.

I claim the following:

1. A caster for tubular legs, provided with a pintle, jaws and a combined leg supporting and pintle centering plate having a central perforate portion for receiving the pintle, an exterior upturned flange forming a collar for surrounding the leg and an outturned continuation thereof extending down and surrounding the said upturned flange.

2. A caster having a pintle, jaws and a sheet-metal member comprising a leg supporting plate, a leg centering flange or bend, and a downturned flange projecting laterally beyond the leg and partially concealing the caster jaws, said member being also centered in respect to the caster pintle and said caster having means for holding it to a tubular metallic leg.

3. In a caster, the combination with a pintle and a horn, of a washer through which the pintle passes and which rests upon the horn, said washer being provided with a raised peripheral rib adapted to inclose the end of a furniture leg and with a downwardly extending flange which conceals the upper portion of the horn and its connection with the pintle.

4. In a caster, the combination with a pintle and a horn, of a washer through which the pintle passes freely and which rests upon the horn, said washer being provided with a groove adapted to receive the end of a furniture leg, with a raised peripheral rib adapted to conceal the end of a furniture leg and with a downwardly extending flange which conceals the upper portion of the horn and its connection with the pintle.

In testimony whereof I have signed this specification in the presence of two subscribing witnesses: this 28th day of June, 1912.

HENRY ILL.

Witnesses:
  JEAN WOLFS,
  JULIUS RUPPRECHT.

Copies of this patent may be obtained for five cents each, by addressing the "Commissioner of Patents, Washington, D. C."